(12) United States Patent
Ito et al.

(10) Patent No.: US 8,603,699 B2
(45) Date of Patent: Dec. 10, 2013

(54) PROTON CONDUCTING ELECTROLYTE AND ELECTROCHEMICAL CELL USING SAME

(75) Inventors: Naoki Ito, Yokohama (JP); Hiroshige Matsumoto, Fukuoka (JP); Tatsumi Ishihara, Fukuoka (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 872 days.

(21) Appl. No.: 12/280,808

(22) PCT Filed: Feb. 27, 2007

(86) PCT No.: PCT/JP2007/054133
§ 371 (c)(1),
(2), (4) Date: Aug. 27, 2008

(87) PCT Pub. No.: WO2007/100124
PCT Pub. Date: Sep. 7, 2007

(65) Prior Publication Data
US 2009/0092881 A1    Apr. 9, 2009

(30) Foreign Application Priority Data

Feb. 28, 2006 (JP) ................... 2006-051607

(51) Int. Cl.
*H01M 8/10* (2006.01)
*H01M 6/18* (2006.01)

(52) U.S. Cl.
USPC ............... 429/497; 429/495; 429/304

(58) Field of Classification Search
USPC .......................... 429/304, 491, 495
See application file for complete search history.

(56) References Cited

U.S. PATENT DOCUMENTS

| 5,672,437 A | 9/1997 | Yajima | |
|---|---|---|---|
| 7,419,736 B2 * | 9/2008 | Taniguchi | ............ 429/495 |

FOREIGN PATENT DOCUMENTS

| CA | 2 516 809 | | 3/2005 |
|---|---|---|---|
| DE | 19547701 A1 | * | 6/1977 |
| DE | 195 47 701 | | 6/1997 |
| DE | 19547701 A1 | * | 6/1997 |
| EP | 1 598 325 | | 11/2005 |
| JP | 6-231611 | | 8/1994 |
| JP | 06-231611 | * | 8/1994 |
| JP | 8-222243 | | 8/1996 |
| JP | 8-277180 | | 10/1996 |
| JP | 9-295866 | | 11/1997 |
| JP | 11-120817 | | 4/1999 |
| JP | 2000-302550 | | 10/2000 |
| JP | 2004-146337 | | 5/2004 |

(Continued)

OTHER PUBLICATIONS

Laidoudi, M. et al., "Study of Proton Conduction in Thulium-doped Barium Zirconates at High Temperatures," J. Phys. D:Appl. Phys. 33(2000), pp. 3112-3120.*

(Continued)

*Primary Examiner* — Karie O'Neill Apicella
(74) *Attorney, Agent, or Firm* — Finnegan, Henderson, Farabow, Garrett & Dunner, LLP

(57) ABSTRACT

A proton conductive electrolyte (20) is made of $AB_{(1-x)}M_xO_3$ structure perovskite, and is characterized in that: the B is Ce; the M is a metal having valence that is smaller than +4; and an average of an ion radius of the M is less than an ion radius of $Tm^{3+}$ and more than 56.4 pm.

4 Claims, 14 Drawing Sheets

(56) References Cited

FOREIGN PATENT DOCUMENTS

| JP | 2005-19041 | 1/2005 |
|----|------------|--------|
| JP | 2006-54170 | 2/2006 |
| WO | WO 2005/024850 | 3/2005 |

OTHER PUBLICATIONS

Higgins, S. et al., "Electrolyte Proton-Conductive Materials for Protonic Ceramic Fuel Cells (PCFCS)," Proceedings of the 26th Riso International Symposium on Materials Science: Solid State Electrochemistry, 2005, pp. 223-228.*

Office Action from the Canadian Patent Office for CA 2,642,544 dated Jul. 21, 2010.

Laidoudi, M. et al., "Study of proton conduction in thulium-doped barium zirconates at high temperatures," J. Phys. D: Appl. Phys. 33 (2000), pp. 3112-3120.

Higgins, S. et al., "Electrolyte Proton-Conductive Materials for Protonic Ceramic Fuel Cells (PCFCS)," Proceedings of the 26$^{th}$ Risø International Symposium on Materials Science: Solid State Electrochemisry, 2005, pp. 223-228.

German Office Action for German Appl. No. 11 2007 000 467.3-45, dated May 10, 2010.

First Notification of the Office Action dated Oct. 16, 2009 for Chinese Appl. No. 200780003667.5.

Notification of Reason(s) for Refusal for Japanese Appl. No. 2006-051607 dated Feb. 7, 2012.

* cited by examiner

HYDROTHERMAL EXAMINATION OF $BaCe_{0.9}Y_{0.1}O_{3-\alpha}$

HYDROTHERMAL EXAMINATION OF $BaCe_{0.9}Tm_{0.1}O_{3-\alpha}$

HYDROTHERMAL EXAMINATION OF $BaCe_{0.9}Yb_{0.1}O_{3-\alpha}$

HYDROTHERMAL EXAMINATION OF $BaCe_{0.9}Lu_{0.1}O_{3-\alpha}$

HYDROTHERMAL EXAMINATION OF $BaCe_{0.9}In_{0.1}O_{3-\alpha}$

HYDROTHERMAL EXAMINATION OF $BaCe_{0.9}Sc_{0.1}O_{3-\alpha}$

US 8,603,699 B2

PROTON CONDUCTING ELECTROLYTE AND ELECTROCHEMICAL CELL USING SAME

CROSS-REFERENCE TO RELATED APPLICATIONS

This application is a national phase application of International Application No. PCT/JP2007/054133, filed Feb. 27, 2007, and claims the priority of Japanese Application No. 2006-051607, filed Feb. 28, 2006, the contents of both of which are incorporated herein by reference.

TECHNICAL FIELD

This invention generally relates to a proton conductive electrolyte and an electrochemical cell having the proton conductive electrolyte.

BACKGROUND ART

Ion conductor is used for an electrochemical cell such as a battery cell, a sensor or a fuel cell. A solid oxide electrolyte is used for the ion conductor. The solid oxide electrolyte is being widely used because the solid oxide electrolyte has high ion conductivity. The solid oxide electrolyte includes a $BaCeO_3$-based perovskite electrolyte. For example, Patent Document 1 discloses an art where a part of Ce site is displaced with Zr, Ti or the like in order to improve chemical stability of the $BaCeO_3$-based perovskite.

Patent Document 1: Japanese Patent Application Publication No. 2000-302550

DISCLOSURE OF THE INVENTION

Problems to be Solved by the Invention

However, electrode activity is lowered between an electrode and an electrolyte, when Zr, Ti or the like is mixed into the Ce site.

An object of the present invention is to provide a proton conductive electrolyte and an electrochemical cell that have high proton conductivity and high chemical stability.

Means for Solving the Problems

A proton conductive electrolyte of the present invention made of $AB_{(1-x)}M_xO_3$ structure perovskite is characterized in that: the B is Ce; the M is a metal having valence that is smaller than +4; and an average of an ion radius of the M is less than an ion radius of $Tm^{3+}$ and more than 56.4 pm.

In the proton conductive electrolyte, there may be formed a hole around the dope metal M, because the valence of the dope metal M is smaller than that of Ce that is a B site metal. Therefore, the proton conductivity of the proton conductive electrolyte is improved. The proton conductive electrolyte keeps the perovskite structure because the average of the ion radius of the dope metal M is larger than 56.4 pm. Therefore, the proton conductive electrolyte has high proton conductivity. And, hydrothermal stability of the proton conductive electrolyte is improved because the average of the ion radius of the dope metal M is less than the ion radius of $Tm^{3+}$. That is, chemical stability is improved. Consequently, it is possible to restrain reduction of electrode activity of an electrode in touch with the electrolyte.

The average of the ion radius of the M may be less than an ion radius of $Ce^{4+}$ and more than 56.4 pm. In this case, the hydrothermal stability is more improved. The average of the ion radius of the M may be less than an ion radius of $Lu^{3+}$ and more than 56.4 pm. In this case, the hydrothermal stability is more improved.

The M may be one of Tm, Yb and Lu. The M may be Lu. In this case, it is possible to improve the hydrothermal stability and keep high proton conductivity. The $AB_{(1-x)}M_xO_3$ may be $BaCe_{(1-x)}M_xO_3$. In this case, the hydrothermal stability is improved.

An electrochemical cell is characterized by comprising: an anode; a proton conductive electrolyte that is claimed in any of claims 1 to 6 and is formed on the anode; and a cathode that is formed on the proton conductive electrolyte. In the electrochemical cell, there may be formed a hole around the dope metal M, because the valence of the dope metal M is smaller than that of Ce that is a B site metal. Therefore, the proton conductivity of the electrolyte is improved. The electrolyte keeps the perovskite structure because the average of the ion radius of the dope metal M is larger than 56.4 pm. Therefore, the electrolyte has high proton conductivity. And, hydrothermal stability of the electrolyte is improved because the average of the ion radius of the dope metal M is less than the ion radius of $Tm^{3+}$. That is, chemical stability of the electrolyte is improved. Consequently, it is possible to restrain reduction of electrode activity of the anode and the cathode.

The anode may be a hydrogen permeable membrane having hydrogen permeability. Water generation is restrained at the anode side, because the electrolyte is not a mixed ion conductor but a proton conductor. Therefore, a peeling is restrained between the hydrogen permeable membrane and the electrolyte. Consequently, the present invention has a particular effect in the fuel cell having the hydrogen permeable membrane.

An operation temperature of the electrochemical cell may be 300 degrees C. to 800 degrees C. Water-splitting reaction progresses in this medium temperature range more than in a high temperature range that is higher than the medium temperature range, because the water-splitting reaction is exothermic reaction. Therefore, the electrolyte having high hydrothermal stability has a particular effect in the electrochemical cell in accordance with the present invention.

Effects of the Invention

According to the present invention, it is possible to obtain high chemical stability and high proton conductivity of an electrolyte with electrode activity being high.

BEST MODES FOR CARRYING OUT THE INVENTION

A description will be given of best modes for carrying out the present invention.
(First Embodiment)

Figure 1:
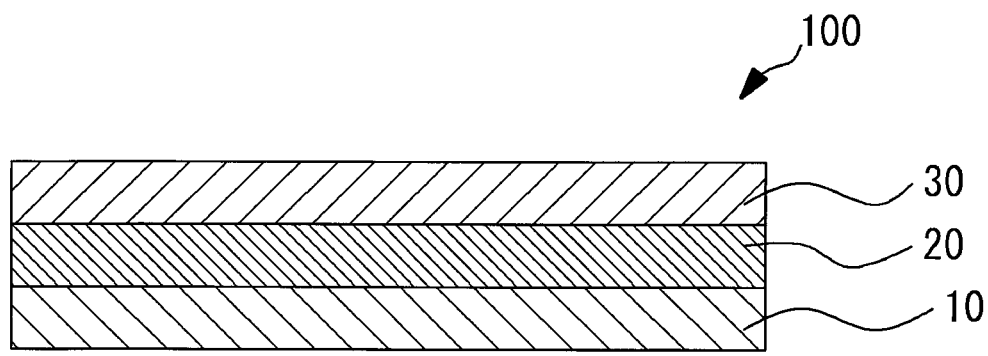
FIG. 1 illustrates a schematic cross sectional view of a fuel cell in accordance with a first embodiment of the present invention.

A description will be given of a fuel cell that is an example of an electrochemical cell and has a proton conductive electrolyte. FIG. 1 illustrates a schematic cross sectional view of a fuel cell 100 in accordance with a first embodiment of the present invention. As shown in FIG. 1, the fuel cell 100 has a structure in which an anode 10, an electrolyte membrane 20 and a cathode 30 are laminated in order. An operation temperature of the fuel cell 100 is 300 degrees C. to 800 degrees C. in the embodiment.

The electrolyte membrane 20 is a perovskite type of proton conductive electrolyte having an ABO$_3$ structure. In the embodiment, A site of the perovskite is Ba (barium), B site is mainly Ce (cerium), and a part of the B site is displaced with a metal other than Ce. Therefore, the perovskite is shown as BaCe$_{(1-x)}$M$_x$O$_3$ with use of chemical structural formula. Here, "x" is a value satisfying 0<x<1. In the embodiment, "x" is 0.1. "x" is preferably less than 0.3, and is more preferably less than 0.2. On the other hand, "x" is preferably more than 0.04, and is more preferably more than 0.1.

"M" mentioned above is a dope metal having valence smaller than +4. The dope metal M may include a single kind of metal and may include more than one kind of metal. There may be formed a hole around the dope metal M, because the valence of the dope metal M is smaller than that of Ce that is a B site metal. Therefore, the proton conductivity of the electrolyte membrane 20 is improved.

Here, the larger an average R of ion radius of the dope metal M is, the more distorted the perovskite is. Therefore, the proton conductivity of the electrolyte membrane 20 is improved. However, hydrothermal stability of the electrolyte membrane 20 is degraded, when the average R is large. Therefore, it is necessary that the average R is smaller than a given value. In the embodiment, the average R is less than 88.0 pm that is an ion radius of Tm$^{3+}$ (thulium). In this case, the proton conductivity and the hydrothermal stability of the electrolyte membrane 20 are improved.

The average R is preferably less than 87.0 pm that is an ion radius of Ce$^{4+}$, and is more preferably less than 86.1 pm that is an ion radius of Lu$^{3+}$ (lutetium). This is because the hydrothermal stability of the electrolyte membrane 20 is improved. The ion radiuses of Tm$^{3+}$, Ce$^{4+}$ and Lu$^{3+}$ are quoted from R. D. Shannon, Acta Crystallogr., A32(1976) 751.

On the other hand, the hydrothermal stability gets improved, as the average R gets smaller. However, the proton conductivity of the electrolyte membrane 20 gets degraded, as the average R gets smaller. Therefore, it is necessary that the average R is larger than a given value. In the embodiment, the average R is larger than a value so that metal oxide composing the electrolyte membrane 20 keeps the perovskite structure.

Tolerance factor t satisfies following expression (1) and expression (2) in the ABO$_3$ type perovskite, when an ion radius of the A site is R$_A$, an ion radius of the B site is R$_B$, and a radius of oxygen ion O$^{2-}$ is R$_O$. The R$_A$ is 136 pm because the A site ion is Ba$^{2+}$ in the embodiment. The radius of the oxygen ion O$^{2-}$ is 136 pm.

$$t=(R_A+R_O)/\sqrt{2}(R_B+R_O) \qquad \text{Expression (1)}$$

$$0.75<t<1 \qquad \text{Expression (2)}$$

Following expression (3) is led from the expressions (1) and (2). It is therefore necessary that the average R is larger than 56.4 pm. In this case, the hydrothermal stability of the electrolyte membrane 20 is improved and the electrolyte membrane 20 has high proton conductivity.

$$56.4\ \text{pm}<R_B<120\ \text{pm} \qquad \text{Expression (3)}$$

The average R is shown as following expression (4), when the dope metal M includes more than one kind of metal.

$$R=x_1 \cdot R_1+x_2 \cdot R_2+x_3 \cdot R_3+ \qquad \text{Expression (4)}$$

x$_n$: a ratio of each dope metal

R$_n$: an ion radius of each dope metal

As mentioned above, the proton conductivity of the electrolyte membrane 20 is improved, when the valence of the dope metal M is smaller than that of the B site metal. And the electrolyte membrane 20 has high proton conductivity and the hydrothermal stability of the electrolyte membrane 20 is improved, when the average R of the ion radius of the metal M is in a given range. It is therefore possible to improve the electrical power generation performance.

A description will be given of an operation of the fuel cell 100. Fuel gas including hydrogen is provided to the anode 10. Some hydrogen in the fuel gas is converted into protons and electrons at the anode 10. The protons are conducted in the electrolyte membrane 20 and gets to the cathode 30. Oxidant gas including oxygen is provided to the cathode 30. The protons react with oxygen in the oxidant gas provided to the cathode 30. Water and electrical power are thus generated. With the operation, the fuel cell 100 generates electrical power. The anode 10 and the cathode 30 keep high electrode activity, because the electrolyte membrane 20 having high hydrothermal stability is used in the embodiment.
(Second Embodiment)

A description will be given of a hydrogen permeable membrane fuel cell 200 that is an example of the electrochemical cells, in a second embodiment. Here, the hydrogen permeable membrane fuel cell is a type of fuel cells, and has a dense hydrogen permeable membrane. The dense hydrogen permeable membrane is a membrane composed of a metal having hydrogen permeability, and acts as an anode. The hydrogen permeable membrane fuel cell has a structure in which an electrolyte having proton conductivity is laminated on the hydrogen permeable membrane. Some of the hydrogen provided to the hydrogen permeable membrane is converted into protons. The protons are conducted in the electrolyte and gets to a cathode. The protons react with oxygen at the cathode. Electrical power is thus generated. A description will be given of details of the hydrogen permeable membrane fuel cell 200.

Figure 2:
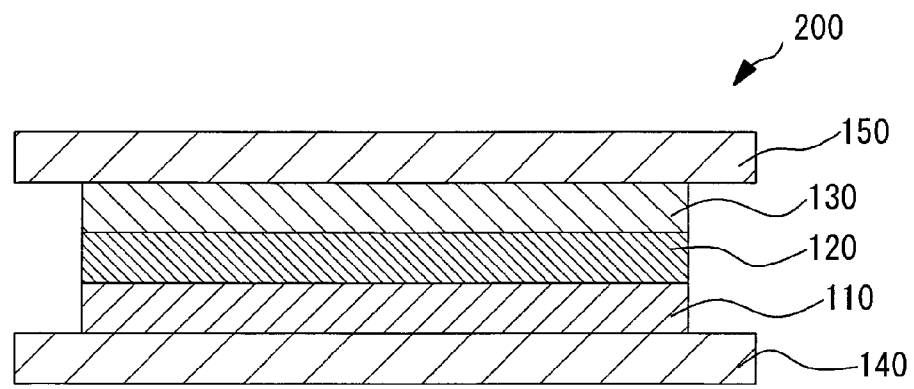
FIG. 2 illustrates a schematic cross sectional view of a hydrogen permeable membrane fuel cell in accordance with a second embodiment.

FIG. 2 illustrates a schematic cross sectional view of the hydrogen permeable membrane fuel cell 200. As shown in FIG. 2, the hydrogen permeable membrane fuel cell 200 has a structure in which an electrical generator is between a separator 140 and a separator 150, the electrical generator having a structure in which an electrolyte membrane 120 and a cathode 130 are laminated on a hydrogen permeable membrane 110 in order. In an actual hydrogen permeable membrane fuel cell, a plurality of unit cells are stacked, although a description will be given of a unit cell shown in FIG. 2 in the second embodiment. In the second embodiment, the hydrogen permeable membrane fuel cell 200 operates at 300 degrees C. to 600 degrees C.

The separators 140 and 150 are made of a conductive material such as stainless steal. The separator 140 has a gas passageway to which fuel gas including hydrogen is to be provided. The separator 150 has a gas passageway to which oxidant gas including oxygen is to be provided.

The hydrogen permeable membrane 110 is made of a hydrogen permeable metal transmitting hydrogen selectively. The hydrogen permeable membrane 110 acts as an anode to which the fuel cell is to be provided, and acts as a supporter supporting and strengthening the electrolyte membrane 120. The hydrogen permeable membrane 110 is made of a metal such as palladium, vanadium, titanium or tantalum. The hydrogen permeable membrane 110 has a thickness of 3 μm to 50 μm, for example. The cathode 130 is made of a conductive material such as $La_{0.6}Sr_{0.4}CoO_3$ or $Sm_{0.5}Sr_{0.5}CoO_3$. The material composing the cathode 130 may support catalyst such as platinum.

The electrolyte membrane 120 has the same structure as the electrolyte membrane 20 in accordance with the first embodiment. Therefore, the electrolyte membrane 120 has high proton conductivity and high hydrothermal stability. Therefore, the hydrogen permeable membrane 110 and the cathode 130 keep high electrode activity. The electrolyte membrane 120 has a thickness of approximately 0.1 μm to 2 μm.

Here, it is necessary that adhesiveness is high between the hydrogen permeable membrane 110 and the electrolyte membrane 120, in order to maintain high electrical generation efficiency of the hydrogen permeable membrane fuel cell 200. Water generation is restrained at the anode side, because the electrolyte membrane 120 is not a mixed ion conductor but a proton conductor. Therefore, a peeling is restrained between the hydrogen permeable membrane 110 and the electrolyte membrane 120, if the electrolyte membrane 120 is used. Consequently, the electrolyte in accordance with the present invention has a particular effect in the hydrogen permeable membrane fuel cell.

EXAMPLES

The electrolyte membranes in accordance with the above-mentioned embodiment were manufactured, and the characteristics were measured.

First Example

Perovskite type electrolytes (samples 1 through 5) that could be used for the electrolyte membrane 20 in FIG. 1 or the electrolyte membrane 120 in FIG. 2 were manufactured in s first example. The sample 1 was made of $BaCe_{0.9}Tm_{0.1}O_{3-\alpha}$. The sample 2 was made of $BaCe_{0.9}Yb_{0.1}O_{3-\alpha}$. The sample 3 was made of $BaCe_{0.9}Lu_{0.1}O_{3-\alpha}$. The sample 4 was made of $BaCe_{0.9}In_{0.1}O_{3-\alpha}$. The sample 5 was made of $BaCe_{0.9}Sc_{0.1}O_{3-\alpha}$. Each electrolyte was cut into a rectangular solid. The samples 1 through 5 had a size of 3 mm×3 mm×12 mm.

First Comparative Example

A perovskite type electrolyte (a comparative sample) was manufactured in a first comparative example. The comparative sample was made of $BaCe_{0.9}Y_{0.1}O_3$. The comparative sample was cut into a rectangular solid. The comparative sample had a size of 3 mm×3 mm×12 mm.

(First Analysis)

Electrolyte characteristics were measured with respect to the samples 2 through 5 and the comparative sample. Electrical conductivity was measured with respect to each of the electrolytes. The electrical conductivity was measured with four terminals method. A platinum paste was used as a current terminal. The platinum paste was baked to each of the electrolytes for 15 minutes at 950 degrees C. Each of the electrolytes was surrounded with a platinum wire having a diameter of 0.1 mm. The platinum wire was used as a voltage terminal. The electrical conductivity was measured with respect to each of the electrolytes in moisture hydrogen gas (bubbler temperature was 10 degrees C.) at eleven temperature points that are every 50 degrees C. from 900 degrees C. to 400 degrees C.

Figure 3:
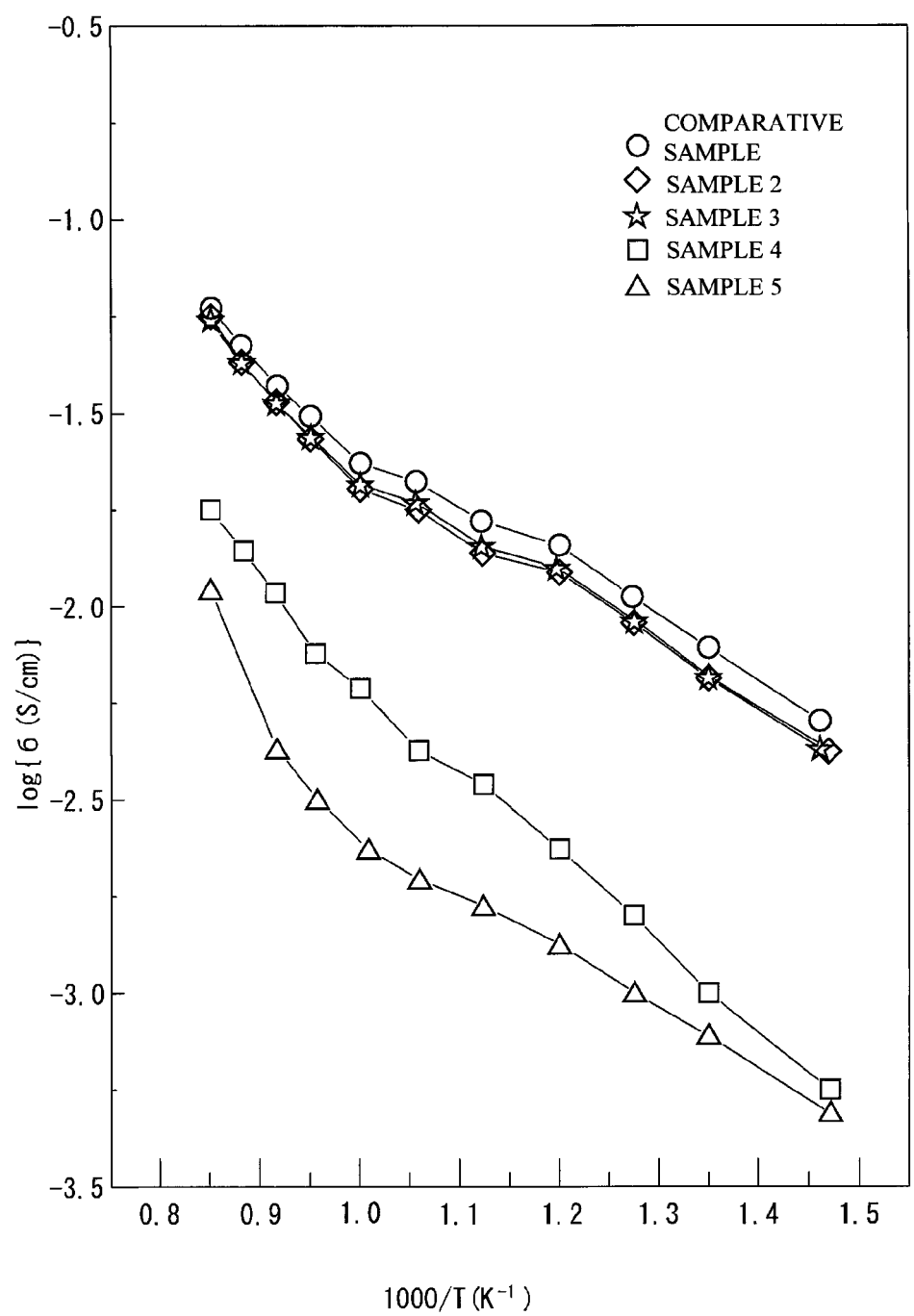
FIG. 3 illustrates electrical conductivity of each electrolyte.

FIG. 3 illustrates the electrical conductivity of each of the electrolytes. Specifically, the electrical conductivity corresponds to proton conductivity. A vertical axis of FIG. 3 indicates a logarithm of the proton conductivity (S/cm). A horizontal axis of FIG. 3 indicates a reciprocal of absolute temperature (1/K). As shown in FIG. 3, the proton conductivities of the samples 4 and 5 were smaller than those of the other electrolytes. On the other hand, the proton conductivities of the samples 2 and 3 and the comparative sample were relatively high. Here, the ion radius of the dope metal in the electrolytes ascends in order from the comparative sample to the sample 1, the sample 2, the sample 3, the sample 4 and the sample 5. It is therefore demonstrated that the larger the ion radius of the dope metal is, the higher the proton conductivity is.

(Second Analysis)

Figure 4:
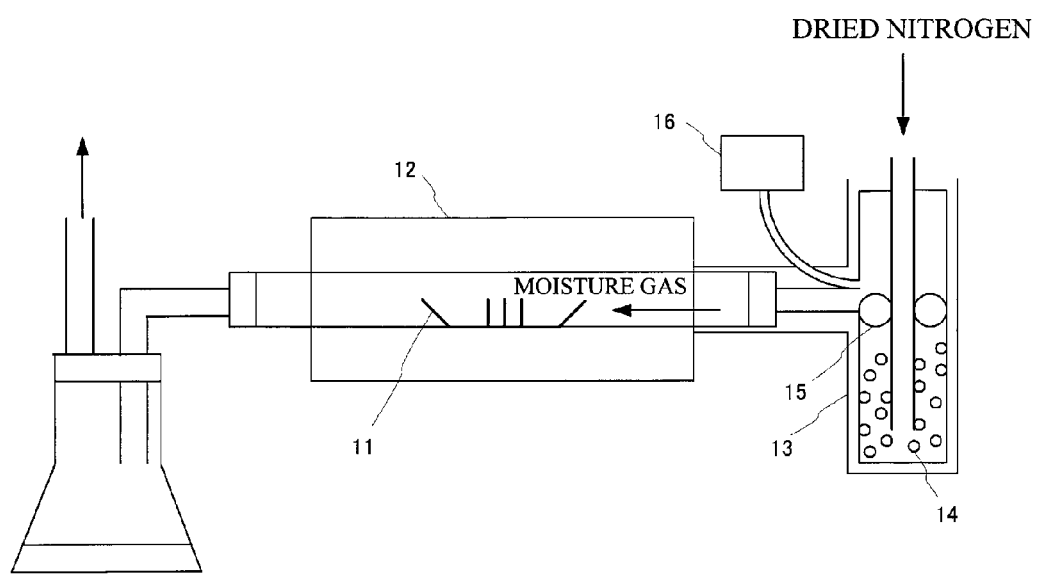
FIG. 4 illustrates a schematic view of hydrothermal examination.

Next, the electrolytes were subjected to hydrothermal examination. Hydrate is generated after the hydrothermal examination in an electrolyte not having hydrothermal resistance. FIG. 4 illustrates a schematic view of the hydrothermal examination. As shown in FIG. 4, each of the electrolytes was arranged on an alumina boat 11 and was housed in a horizontal electric furnace 12. Nitrogen gas passed through a glass bead 14 and a silica wool 15 that were heated to 110 degrees C. to 120 degrees C. with a ribbon heater 13, and was dried. The dried nitrogen gas was provided into the horizontal electric furnace 12 at a flow rate of 20 ml/min, when the horizontal electric furnace 12 was being heated. Liquid water was provided into the horizontal electric furnace 12 at a flow rate of 3.9 ml/min (at a flow rate of approximately 80 ml/min in a case of water vapor) with a syringe pump 16, after the temperature of the horizontal electric furnace 12 reached 400 degrees C. The horizontal electric furnace 12 had been kept for ten hours in the above-mentioned condition. After that, the operation of the syringe pump 16 was stopped. The temperature in the horizontal electric furnace 12 was reduced with the atmosphere in the horizontal electric furnace 12 being displaced with the dried nitrogen gas.

After that, each of the electrolytes was subjected to XRD measuring. And it was investigated whether hydrate was detected or not. Cu—Kα ray was used as X-ray source. FIG. 5 through FIG. 10 illustrate a result of the XRD measuring of each of the electrolytes. In FIG. 5 through FIG. 10, a vertical axis indicates XRD intensity, and a horizontal axis indicates diffraction angle. "before" in the figures indicates results of the XRD measuring of the electrolytes before the hydrothermal examination, and "after" in the figures indicates results of the XRD measuring of the electrolytes after the hydrothermal examination.

Figure 5:
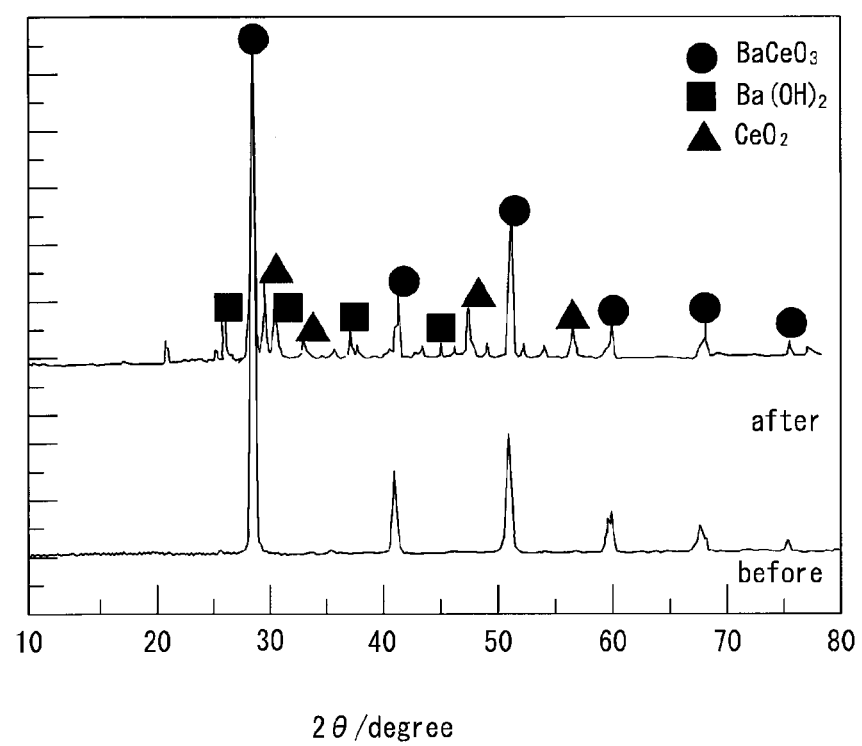
FIG. 5 illustrates XRD measuring result of $BaCe_{0.9}Y_{0.1}O_3$.
Figure 6:
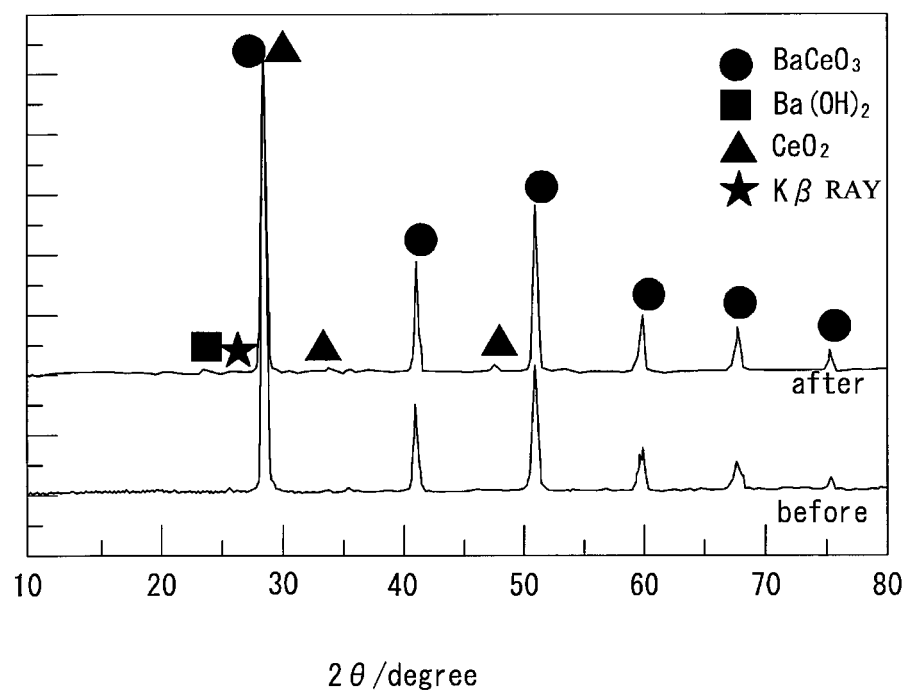
FIG. 6 illustrates XRD measuring result of $BaCe_{0.9}Tm_{0.1}O_3$.
Figure 7:
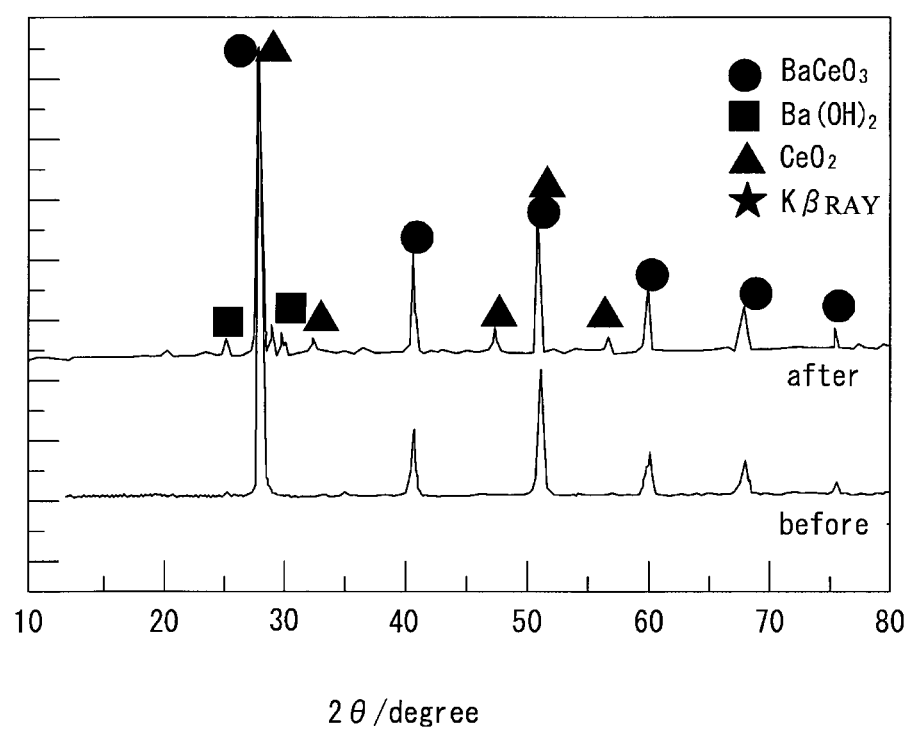
FIG. 7 illustrates XRD measuring result of $BaCe_{0.9}Yb_{0.1}O_3$.
Figure 8:
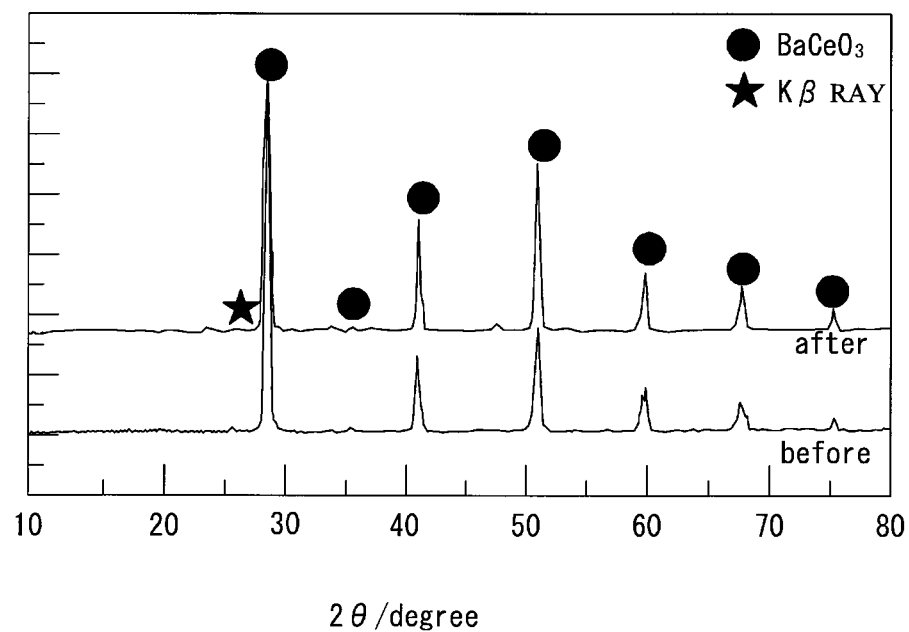
FIG. 8 illustrates XRD measuring result of $BaCe_{0.9}Lu_{0.1}O_3$.
Figure 9:
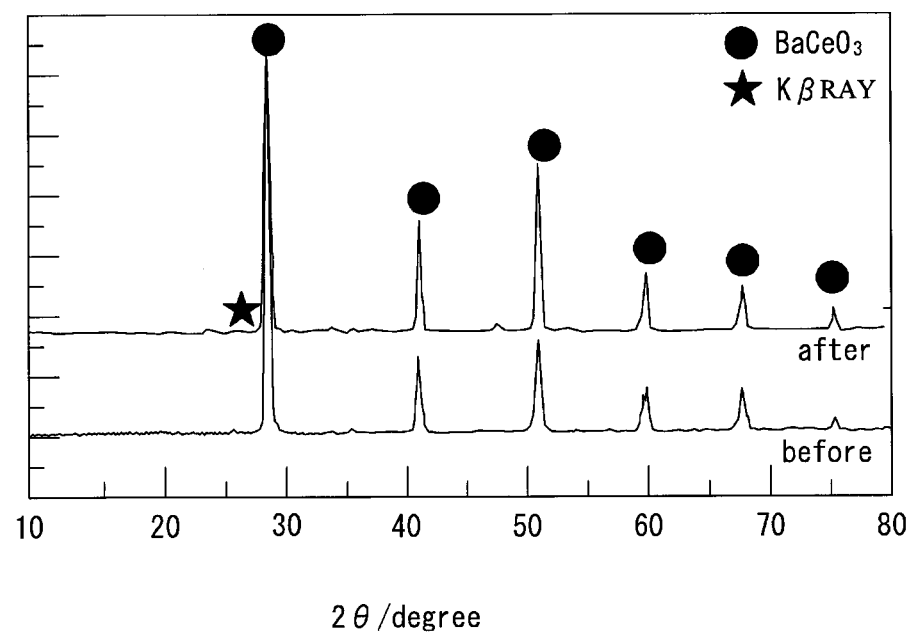
FIG. 9 illustrates XRD measuring result of BaCe$_{0.9}$In$_{0.1}$O$_3$.
Figure 10:
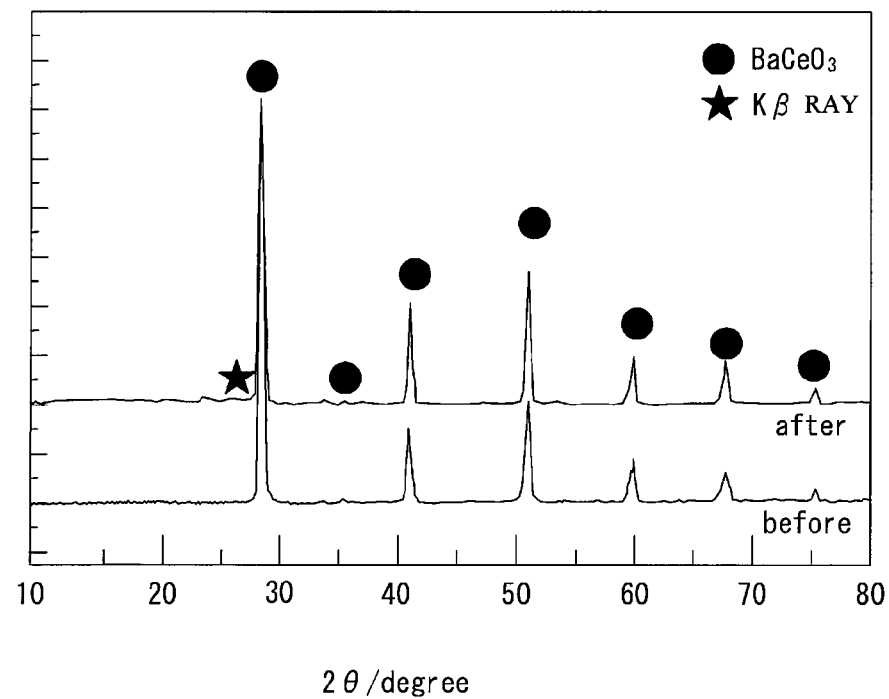
FIG. 10 illustrates XRD measuring result of BaCe$_{0.9}$Sc$_{0.1}$O$_3$.

As shown in FIG. 5, Ba(OH)$_2$ was detected notably after the hydrothermal examination with respect to the comparative sample. It is therefore demonstrated that the comparative sample does not have hydrothermal resistance. As shown in FIG. 6 and FIG. 7, Ba(OH)$_2$ was detected after the hydrothermal examination with respect to the samples 1 and 2. However, the XRD intensity was very small. It is therefore demonstrated that the samples 1 and 2 have higher hydrothermal resistance than the comparative sample. As shown in FIG. 8 through FIG. 10, Ba(OH)$_2$ was not detected after the hydrothermal examination with respect to the samples 3 through 5. It is therefore demonstrated that the samples 3 through 5 have high hydrothermal resistance.

Figure 11:
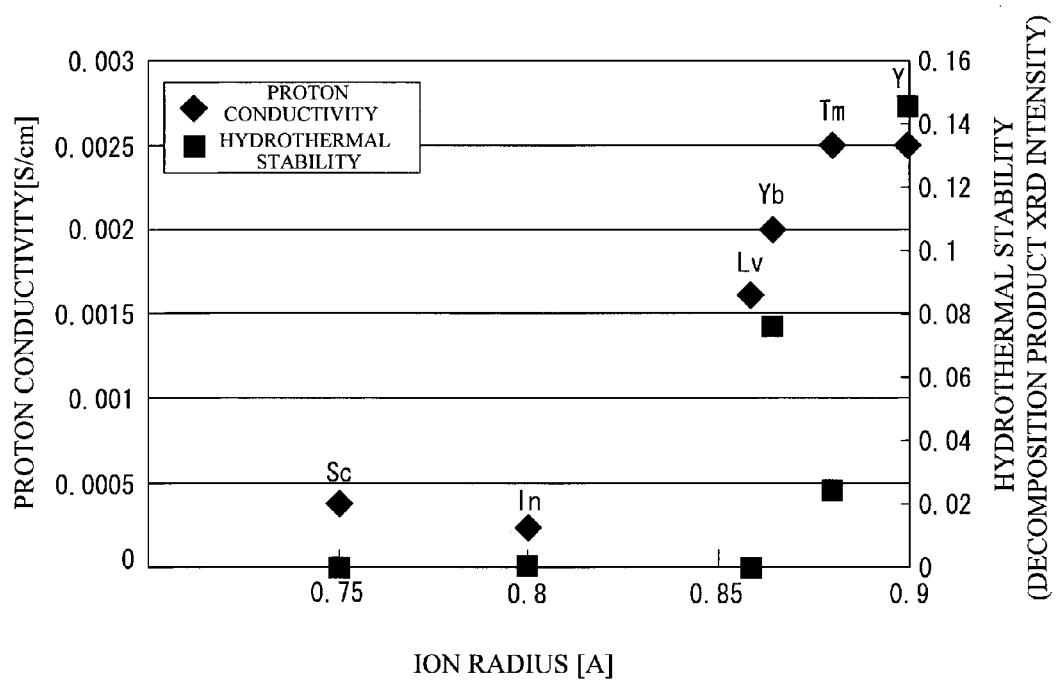
FIG. 11 illustrates electrical conductivity and XRD measuring result of each electrolyte.

FIG. 11 and Table 1 show the above-mentioned results. In FIG. 11, a vertical axis indicates proton conductivity (S/cm) at 400 degrees C., and a horizontal axis indicates hydrothermal stability (XRD intensity of Ba(OH)$_2$). As shown in FIG. 11 and Table 1, it is demonstrated that the proton conductivity is improved but the hydrothermal stability is degraded when the ion radius of the dope metal is enlarged. And it is demonstrated that the hydrothermal stability is improved but the proton conductivity is degraded when the ion radius of the dope metal is reduced.

TABLE 1

|  | Comparative Sample | Sample 1 | Sample 2 | Sample 3 | Sample 4 | Sample 5 |
|---|---|---|---|---|---|---|
| Ion radius of dope metal (pm) | 90.0 | 88.0 | 86.8 | 86.1 | 80.0 | 74.5 |
| Hydrothermal stability | bad | medium | medium | good | good | good |
| Proton conductivity | high | high | high | high | low | low |

With the above-mentioned results, it is necessary that the ion radius of the dope metal is less than 88.0 pm that is an ion radius of Tm$^{3+}$, it is preferable that the ion radius of the dope metal is less than 87.0 pm that is an ion radius of Ce$^{4+}$, and it is more preferable that the ion radius of the dope metal is less than 86.1 pm that is an ion radius of Lu$^{3+}$. Each of the ion radiuses shown in Table 1 is quoted from R. D. Shannon, Acta Crystallogr., A32 (1976) 751.

Second Example

In a second sample, the fuel cell 100 in accordance with the first embodiment was manufactured. A description will be given of a manufacturing method of the fuel cell 100 in accordance with the second example. At first, oxide or carbonate of Ba, Ce and Lu were mixed wetly in ethanol. Next, the mixture was calcined in an air atmosphere for 10 hours at 1250 degrees C., and was crushed in a planetary ball mill. Then, the crushed sample was formed with isostatic pressing. Next, the formed sample was calcined in an air atmosphere for 10 hours at 1650 degrees C. And a disk-shaped electrolyte was manufactured. The disk-shaped electrolyte was composed of BaCe$_{0.9}$Lu$_{0.1}$O$_{3-\alpha}$, had a diameter of approximately 13.5 mm and had a thickness of 0.5 mm. The electrolyte corresponds to the electrolyte membrane 20 shown in FIG. 1.

Next, a circular platinum paste having a diameter of 0.8 mm (TR-7907 made by Tanaka Kikinzoku Kogyo K.K.) was coated at center portion of both faces of the electrolyte with screen print method. The platinum paste was baked for 30 minutes at 950 degrees C. This results in a formation of a porous platinum electrode. These electrodes of the both faces respectively correspond to the anode 10 and the cathode 30 shown in FIG. 1.

Second Comparative Example

In a second comparative example, a fuel cell similar to that in accordance with the second example was manufactured. The fuel cell in accordance with the second comparative example was different from that in accordance with the second example in a point that an electrolyte is made of BaCe$_{0.9}$Y$_{0.1}$O$_{3-\alpha}$ instead of BaCe$_{0.9}$Lu$_{0.1}$O$_{3-\alpha}$. This electrolyte was manufactured with as the same method as the second example.

(Third Analysis)

Figure 12:
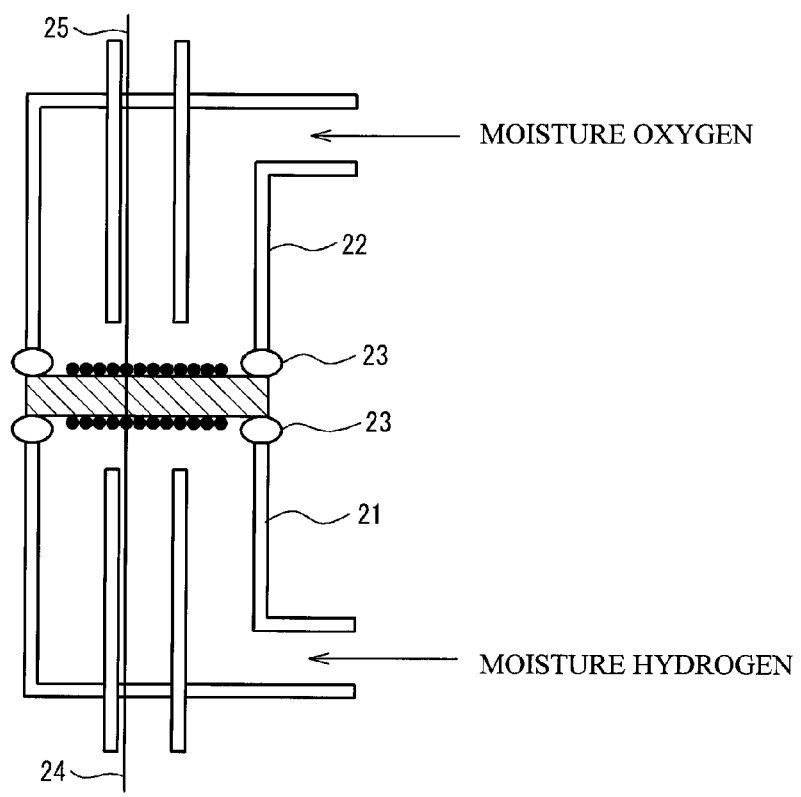
FIG. 12 illustrates a schematic view of an examination of electrical power generation performance.

Next, electric power generation performance was measured with respect to the fuel cells in accordance with the second example and the second comparative example. FIG. 12 illustrates a schematic view of an examination of an electrical power generation performance. As shown in FIG. 12, a pipe 21 was connected to a face on the anode side of the electrolyte, and a pipe 22 was connected to a face on the cathode side of the electrolyte. A glass seal 23 sealed between the pipes 21 and 22 and the electrolyte. Leads 24 and 25 were connected to each of the electrolytes via a platinum net and a platinum paste. The temperature of the fuel cells was kept at a given temperature (600 degrees C. and 800 degrees C.) in the electric furnace. Pure hydrogen gas was provided to the anode at a flow rate of 30 mL/min. Pure oxygen gas was provided to the cathode at a flow rate of 30 mL/min. These gases were moistened with a saturated water vapor at 17 degrees C. (at a water vapor partial pressure of approximately 1900 Pa). Thus, each fuel cell generated electrical power.

Figure 13:
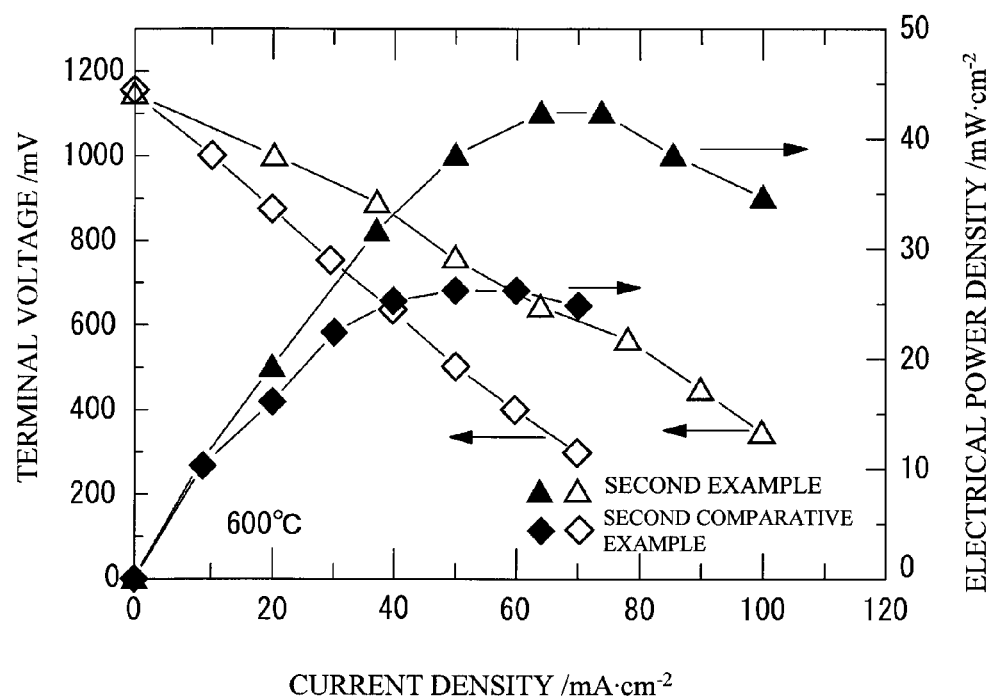
FIG. 13 illustrates electrical power generation performance at an operation temperature of 600 degrees C.

FIG. 13 illustrates the electrical power generation performance of the fuel cell operating at 600 degrees C. In FIG. 13, a left-side vertical axis indicates terminal voltage, a right-side vertical axis indicates electrical power density, and a horizontal axis indicates current density. Here, the terminal voltage indicates an electrical potential difference between the lead 24 and the lead 25. The current density is a current flowing per unit electrode area. The electrical power density is a product of the terminal voltage and the current density. In this case, the higher the terminal voltage is, the higher the electrical power density is with respect to the same current density. The electrical power generation performance is determined with a level of the electrical power density.

As shown in FIG. 13, the terminal voltage of the fuel cell in accordance with the second example was higher than that of the fuel cell in accordance with the second comparative example with respect to the same current density. It is therefore demonstrated that the electrical power generation performance of the fuel cell in accordance with the second example is higher than that of the fuel cell in accordance with the second comparative example. This is because the fuel cell in accordance with the second example has high proton conductivity and high hydrothermal stability.

Figure 14:
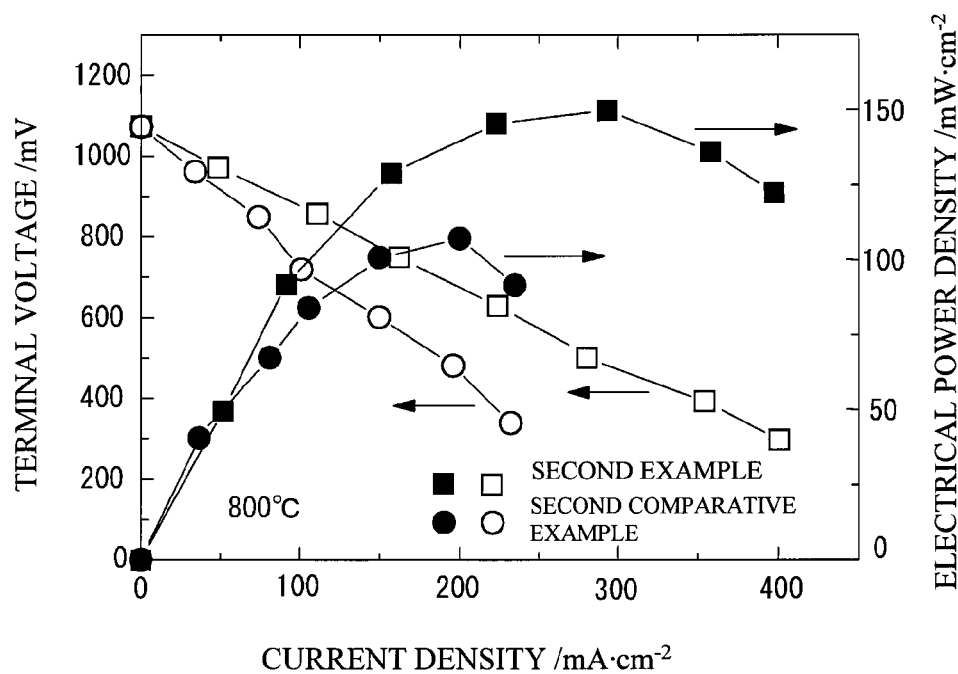
FIG. 14 illustrates electrical power generation performance at an operation temperature of 800 degrees C.

FIG. 14 illustrates electrical power generation performance of the fuel cell operating at 800 degrees C. As shown in FIG. 14, the terminal voltage of the fuel cell in accordance with the second example was higher than that of the fuel cell in accordance with the second comparative example. It is therefore demonstrated that the electrical power generation performance of the fuel cell in accordance with the second example is higher than that of the fuel cell in accordance with the second comparative example at an operation temperature of 800 degrees C.

The invention claimed is:

1. A proton conductive electrolyte made of $AB_{(1-x)}M_xO_3$ structure perovskite, wherein:
   the x is 0.1 to less than 0.3;
   the A is Ba;
   the B is Ce; and
   the M is Lu.

2. An electrochemical cell comprising:
   an anode;
   a proton conductive electrolyte that is made of $AB_{(1-x)}M_xO_3$ structure perovskite and is formed on the anode,
   the x being 0.1 to less than 0.3;
   the A being Ba;
   the B being Ce, the M is Lu; and
   a cathode that is formed on the proton conductive electrolyte.

3. The electrochemical cell as claimed in claim 2 wherein the anode is a hydrogen permeable membrane having hydrogen permeability, 4. The electrochemical cell as claimed in claim 2 wherein an operation temperature of the electrochemical cell is 300° C. to 800° C.

* * * * *